United States Patent [19]

Seydel et al.

[11] Patent Number: 5,160,154
[45] Date of Patent: Nov. 3, 1992

[54] HAND TRUCK FOR TRANSPORTING MULTIPLE BINS

[75] Inventors: Matthew H. Seydel; Katherine G. Seydel, both of Salinas, Calif.

[73] Assignee: Curb E-Z, Salinas, Calif.

[21] Appl. No.: 763,391

[22] Filed: Sep. 20, 1991

[51] Int. Cl.⁵ .............................................. B62B 1/26
[52] U.S. Cl. .................................................. 280/47.19
[58] Field of Search ............... 280/47.19, 47.26, 47.24, 280/47.18, 47.35

[56] References Cited

U.S. PATENT DOCUMENTS

| 2,405,674 | 8/1946 | Schliwa et al. | 280/47.26 |
| 4,521,030 | 6/1985 | Vance | 280/47.26 |
| 4,790,549 | 12/1988 | Armand | 280/47.26 |
| 4,984,704 | 1/1991 | O'Malley | 280/47.19 |

FOREIGN PATENT DOCUMENTS 1225506 9/1966 Fed. Rep. of Germany ... 280/47.19

Primary Examiner—David M. Mitchell

[57] ABSTRACT

A hand truck for storing and transporting boxes or bins is constructed with a single vertical member having a handle at one end and an axle bearing two wheels on the distal end. Supports and fasteners are affixed along the vertical member in a spacing determined by the vertical dimension of the bins to be used. Fasteners are formed from right angle or U-shaped materials which form a channel into which an edge of the bin may be placed to secure the bin to the hand truck. Supports hold the bins in proximity to the fasteners until bin removal is desired. Attaching the bins to the hand truck is achieved by tipping the bin so that an edge of the bin may be placed in the fastener channel.

14 Claims, 7 Drawing Sheets

HAND TRUCK FOR TRANSPORTING MULTIPLE BINS

TECHNICAL FIELD

The present invention relates to manually operated wheeled devices for moving packaged materials, and more specifically to hand trucks adapted for holding and transporting more than one such package, bundle, open carton and the like.

BACKGROUND ART

It is well known in the materials handling art that the use of a wheeled cart facilitates the single-handed movement of boxes or bundles of materials. The two wheeled hand truck has been adapted in many forms to allow the gripping or supporting of both regular and irregular shaped bundles. Such devices allow an individual to move heavy or bulky loads with economy of effort. Several adaptations of the hand truck illustrate the variety of uses for the hand truck.

U.S. Pat. No. 2,430,107 (Cronrath) discloses an adaptation of the hand truck for lifting and carrying motions in preparation for transportation. Cronrath discloses the addition of rockers which form a variable fulcrum for shifting the hand cart over a vertical range of distances. In use, the hand truck is positioned under a hanging load to be received, the adjustable shelf affixed to the hand truck is raised to contact the lower surface of the hanging load, and the hand truck is rocked forward on the rockers, effectively raising the shelf which then lifts the hanging load from its supporting hanger. When the load is disengaged from the supporting hanger the load is supported entirely by the shelf. The hand truck is then rotated back onto its wheels and the load is transported in the customary hand truck manner. The hand truck disclosed by Cronrath is of necessity sturdily built of relatively massive members suitable for the weight of the loads transported and to accommodate the lever-like manner in which it is used to lift the load. Cronrath does not suggest or teach that the hand truck could be constructed otherwise.

U.S. Pat. No. 4,632,412 (Nasgowitz) discloses a light weight hand truck suitable for holding light materials and moving the entire assemblage from place to place, as for example a moveable display within a store. The apparatus disclosed by Nasgowitz is fundamentally a box divided diagonally and configured with fasteners so that one section of the box may be attached to the other section, forming a hand truck shaped configuration. The addition of wheels completes the transformation from box to hand truck and the addition of shelves increases the supporting area available to hold the materials to be displayed. Nasgowitz teaches that a hand truck can be formed of light weight materials and that shelving can be added to increase the carrying capacity. Nasgowitz does not suggest, however, how additional carrying capacity can be obtained without the use of shelving.

U.S. Pat. No. 2,921,694 (Decker et al) discloses a hand truck adapted to be collapsible for storage or shipment. Decker teaches that such a hand truck can be sturdily constructed using a box frame with cross braces for the back and shaped side pieces detachably affixed to the base to form the traditional hand truck. The material to be carried and displayed is stacked on the base in a manner well known in the marketing art. A shelf or shelves may be added for additional display surface. Decker neither teaches nor suggests that the material to be transported is attached to the hand truck to prevent its dislodgment while being transported or supported.

U.S. Pat. No. 4,521,030 (Vance) discloses a hand truck constructed of light weight materials and adapted to be collapsible to facilitate storage. Vance teaches that two parallel upright members with a wheel at one end of each member and a handle at the distal end of each may be connected with suitably formed cross pieces to form shelves and other supports for the materials to be transported. Vance suggests that the transported materials may be detachably fastened to the apparatus with elastic cords or the like. The hand truck disclosed by Vance necessarily utilizes complex, carefully crafted pivotal fasteners to assemble the apparatus in such a manner that it may be collapsed for storage. Vance does not, however, teach how the hand truck can be simplified and constructed in a noncollapsible manner.

Each of the above described variations on the basic hand truck design address a particular need or a specific purpose. None, however, address the need for easily, simply and quickly attaching packages for transport.

In modern society, the current rate of consumption of materials which are used but not destroyed by that use has prompted a growing interest in recycling the objects from which those materials are made. The collection and recycling of aluminum, glass and plastic containers and newspapers are widely practiced examples of the materials which may be recycled, but which must be separated for recycling.

Recycling of materials used in the home typically requires the use of containers, frequently open boxes, bins or baskets, to segregate and collect the materials of different types to be recycled. When these containers are filled they must be transported somewhere to be emptied. In many cities this means that the filled containers are placed out at the curb or in the alley to be emptied by specially assigned trucks authorized by the municipality to perform the collection service. In many municipalities this service also includes standardized bins, often color coded, in which the materials are to be collected.

While the home owner is offered the convenience of having the recyclable material picked up, the homeowner is still faced with the inconvenience of storing the different containers while they are being filled, and then transporting the containers to the designated collection place. Storage of more than one box requires that the boxes either be spread out so that each may be accessed as needed, or that they be stacked and unstacked so that materials may be added to the containers below the topmost container.

DISCLOSURE OF INVENTION

The present invention addresses the need felt by the homeowner for a hand truck to easily attach and transport containers of recyclable materials. In addition to providing both the storage and transportation of recycling bins, the present invention also provides convenient access to the bins without additional handling.

The present invention provides a hand truck for the home owner to conveniently both store collection bins and transport them, once filled, to the designated collection point. The present invention also allows the stacking of two or more collection bins in such a way that all bins are accessible for filling. The present invention then allows the user to then easily transport the filled bins to the collection point in one trip. The filled bins can then be easily removed from the hand truck by the collecting service personnel for emptying.

A hand truck constructed according to the present invention utilizes light weight materials such as aluminum tubular and angle stock. These materials are assembled into a sturdy, easily maneuvered hand truck. The simple method of affixing the collection bins to the hand truck requires no moving parts or fasteners made of degradable materials such as ropes or elastomeric cords.

The present invention utilizes a single vertical member to which the wheels, fasteners and support members for the bins are attached. The fasteners, support members and the axle for the wheels are rigidly attached to the single vertical member. The lowermost support member is adapted to form a stabilizing brace and foot to provide the necessary stability to support the stacked collection bins while they are being stored and filled. The upper end of the vertical member is formed into a handle with which the hand truck may be grasped and maneuvered when the bins need to be transported to the collection point. This allows two or more bins to be stored and transported at once with a minimum of effort by the user.

BRIEF DESCRIPTION OF DRAWINGS

For fuller understanding of the present invention, reference is made to the accompanying drawing in the following detailed Description of the Preferred Embodiment of the invention. In the drawing.

Figure 1A:
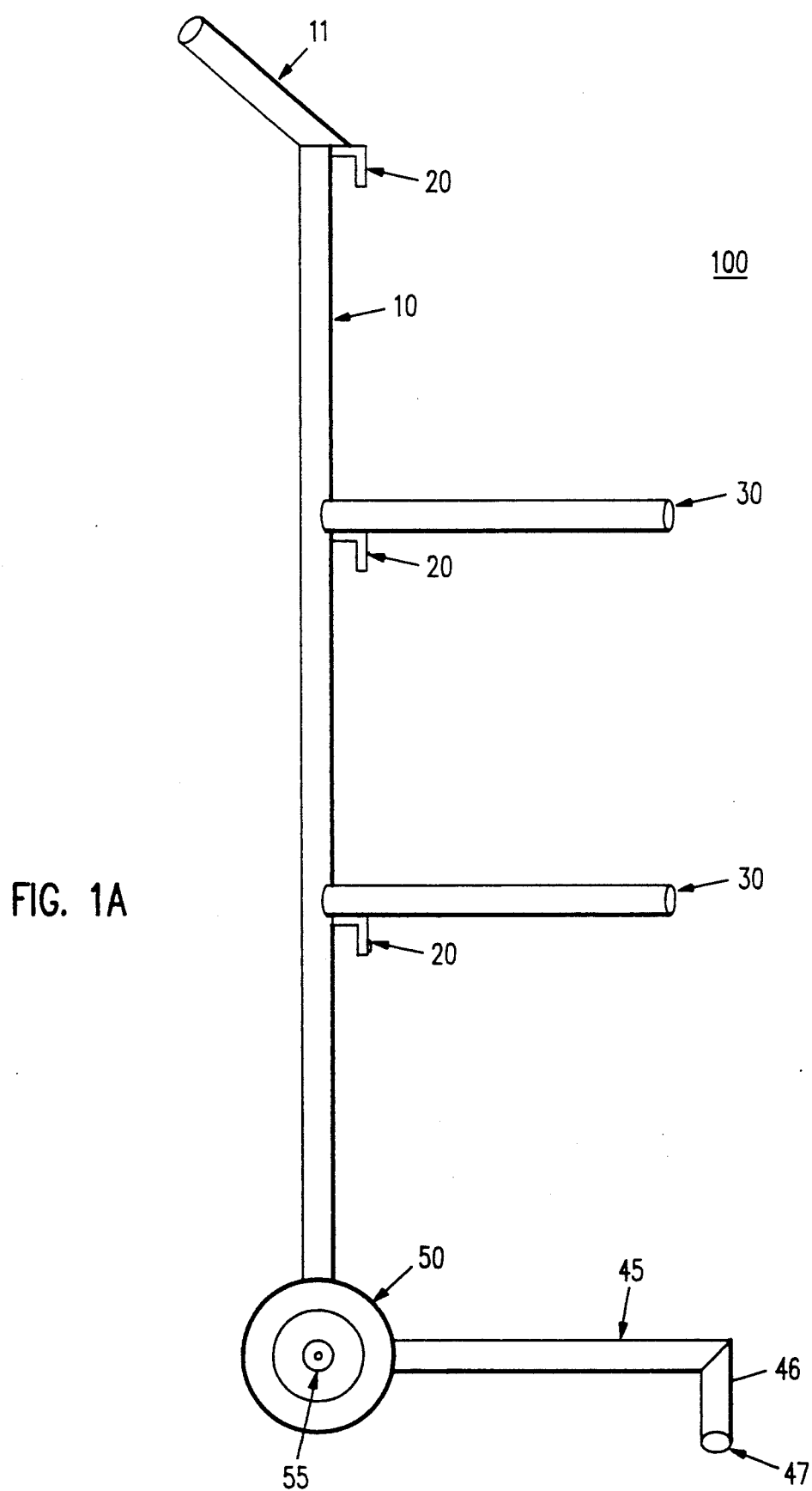
FIG. 1A is a side view of a hand truck constructed according to the principles of the present invention.

Reference numbers refer to the same or equivalent parts of the present invention throughout the several figures of the drawing.

BEST MODE OF CARRYING OUT THE INVENTION

Referring now to FIGS. 1 and 2, hand truck 100 constructed according to the principles of the present invention is shown. In the description below, reference to similar components which may be described in the singular should be understood to also refer to all of the similar components.

Vertical member 10 is formed with handle 11 at one end and axle assembly 40 attached at the distal end. Member 10 may be made of any strong, light weight material. Heavy walled aluminum square or round tubing stock is preferred while other materials, including hardwoods, high strength polymeric materials or other metals such as steel or magnesium, may be utilized. In the several figures of the drawing round and square stock is illustrated. Such illustration is not intended to limit in any manner the shape of the materials utilized in the construction of the present invention.

Handle 11 may be formed by bending the end of member 10 to a convenient angle as shown in FIG. 1. Other methods of forming handle 11 separately and attaching it to member 10 may be used, depending on the materials of which member 10 and handle 11 are constructed. For example, metals may be welded together or fastened with rivets, bolts or the like. Wooden materials may be bent with the aid of steam as is well known in the art. If handle 11 is constructed separately from, then attached to, member 10, additional bracing plate (not illustrated) may be desirable.

Figure 1B:
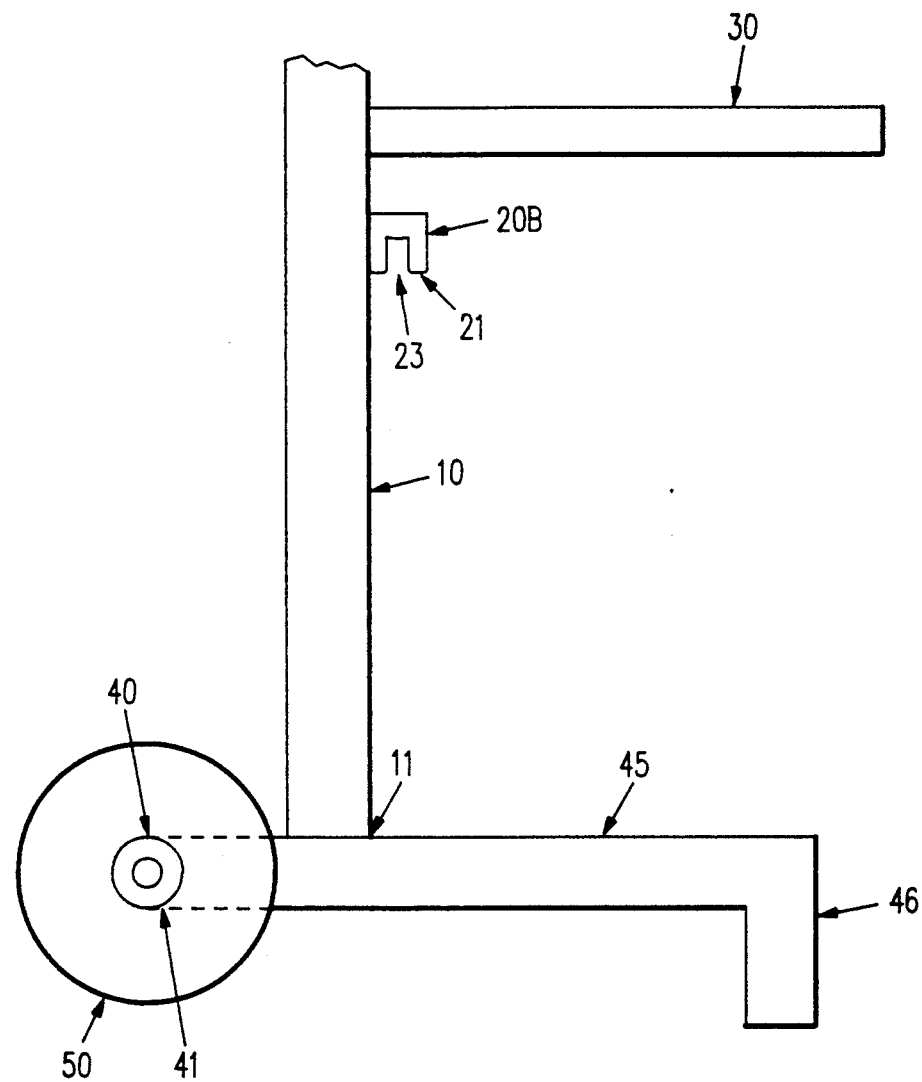
FIG. 1B is a detail side view of an alternative embodiment of a fastener and brace for the hand truck of FIG. 1.
Figure 1C:
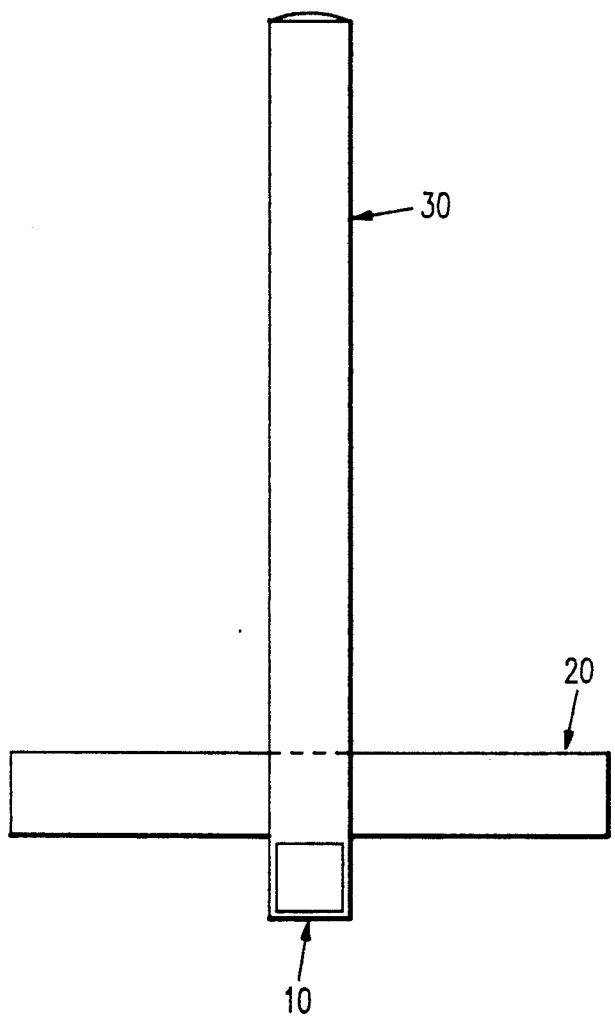
FIG. 1C is a detail top view of an alternative cross section of the materials of construction for the hand truck of FIG. 1.
Figure 2A:
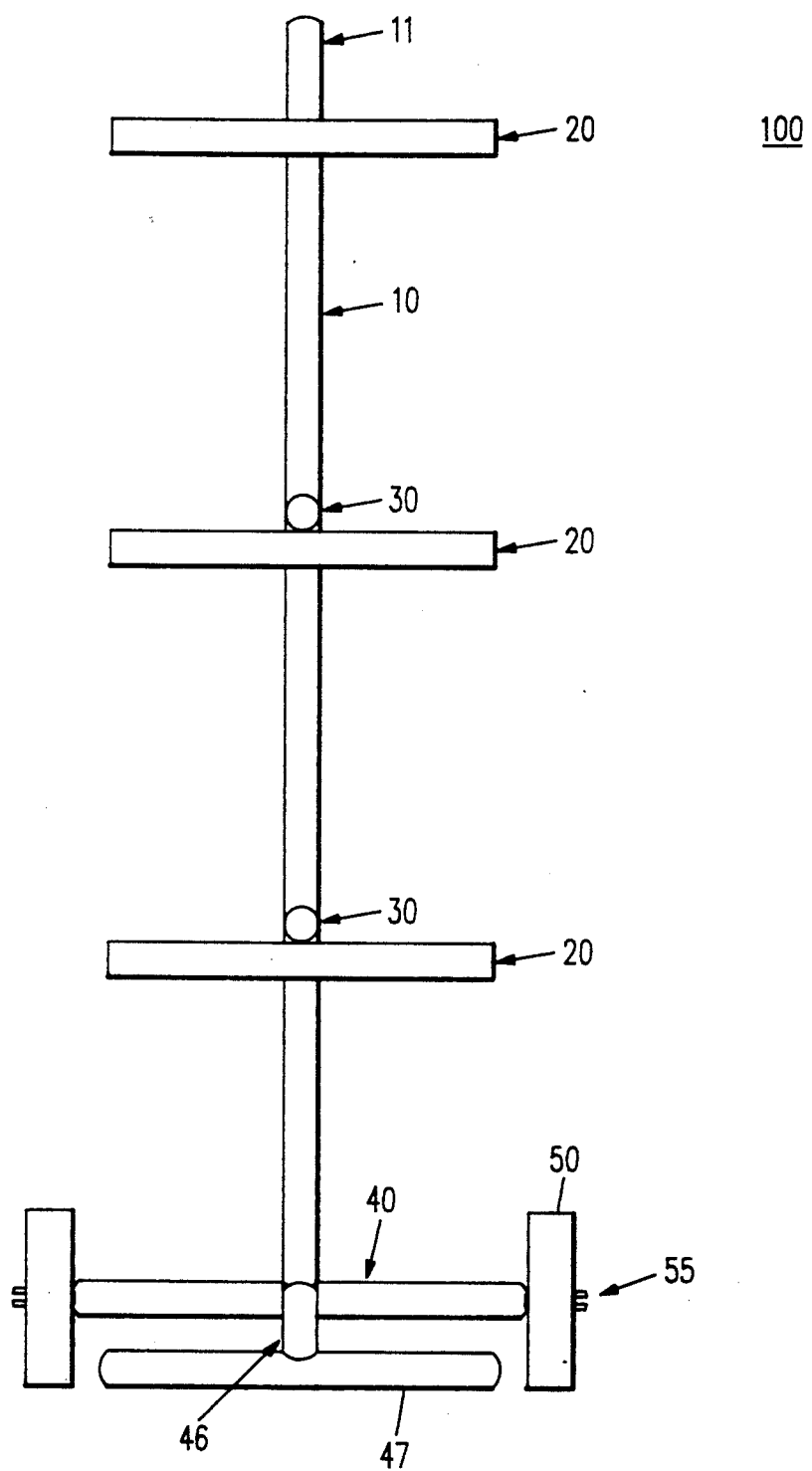
FIG. 2A is a front view of the hand truck of FIG. 1.

Axle assembly 40 is rigidly attached to member 10 at the opposite end from handle 11. Assembly 40 is welded at right angles to member 10 as indicated in FIG. 1A. FIG. 1B illustrates an alternative mounting geometry as described elsewhere in this specification. Assembly 40 may be hollow, allowing a separate rod to be inserted therethrough, thereby forming an axle upon which wheels 50 may rotate. This would provide the least expensive mode of manufacturing of the present invention. It may, however, be advantageous if assembly 40 is constructed from solid stock. This may prove to facilitate attaching member 10 to assembly 40 by welding for example. In this latter instance, axles suitable for receiving wheels 50 must be formed on either end of assembly 40 in a manner well known in the art.

Wheels 50 may be of any dimension considered suitable for the surface over which the hand truck of the present invention is to be operated. Wheels four to six inches in diameter for example, would be suitable for use over smooth hard surfaces, while larger wheels may be utilized for operation over irregular or soft surfaces. Wheels 50 are attached to the axles of assembly 40 in any manner well known in the art. Wheel retainers 55 for example, may be nuts on a threaded termination of the axle, cotter pins through holes in the end of the axle or snap-on retainers.

Brace 45 is attached to member 10 at right angles to assembly 40 as well as to member 10, so that the three components are mutually orthogonal. Brace 45 extends forward of member 10 and beyond supports 30 as shown in FIG. 1A. Brace 45 is typically 10 to 14 inches long, a dimension determined by the width of the bins to be utilized with the present invention. Brace 45 is dimensioned such that it extends forward of the center of gravity of the hand truck of the present invention when used with filled bins, thereby providing a stable structure resistant to tipping in the plane formed by member 10 and brace 45.

As shown in detail FIG. 1B, the orthogonal geometry of brace 45, member 10 and assembly 40 may also be achieved by displacing the attachment point 12 of vertical member 10 and attachment point 41 of assembly 40 from a single location to two separate locations along the length of brace 45. By displacing assembly 40 toward the rear of the assembled hand truck, stability may be increased to accommodate larger loads while retaining or increasing the mechanical advantage inherent in a hand truck.

Brace 45 is terminated in leg 46 on the end opposite the point of attachment of brace 45 to member 10. Leg 46 forms an extension of brace 45 and is dimensioned so as to correspond to the radius of the wheels selected for use. Foot 47 is attached to leg 46 at right angles to leg 46 and parallel to assembly 40. Foot 47 may be of any suitable length to provide stability to the structure in a plane at right angles to that formed by member 10 and brace 45. A suitable length, for example, may be between six to twelve inches and in some instances foot 47 may be less than 6 inches in length, or if desired for certain applications, foot 47 may be deleted entirely.

Referring further to FIGS. 1B and 1C, 2A through 2C, and 3, fasteners 20 are rigidly attached parallel to assembly 40 and at right angles to member 10 at intervals along member 10. The interval along member 10 is determined by the vertical dimension 94 of the bins to be utilized with the present invention as described elsewhere in this specification. The length of fastener 20 is determined by the length of edge 91 of side 93 of bin 90. Fastener 20 is constructed so that its length is less than that of edge 91 for reasons described elsewhere in this application.

In the preferred embodiment utilizing aluminum for member 10, fastener 20 would be constructed of aluminum right angle stock for ease of attaching fastener 20 by welding. If other materials are selected for member 10, the material of which fastener 20 is constructed may be chosen for other reasons. For example, if member 10 is some other metal, fastener 20 would be of similar metal if the attachment is formed by welding. If it is desired to attach fastener 20 to member 10 by bolts or other similar fastening devices, similarity of materials is not necessary. It may be desirable, for example, to construct the present invention of natural materials such as hardwoods of suitable strength.

In a second embodiment of the present invention, fastener 20A may be formed of U-shaped, or channel shaped, materials. As shown in FIG. 1B, fastener 20A is attached in the same place and manner as described herein in reference to fastener 20. In this embodiment, lip 21 serves the same function as described hereinbelow. Cavity 23 within U-shaped fastener 20A serves to retain edge 91 of bin 90 when bin 90 is attached as described elsewhere in this specification. This embodiment may be preferred in some instances such as when attachment of fastener 20 to member 10 by bolting is desired for example. This embodiment may also be desirable to facilitate joining fastener 20 to member 10 by welding or for instances where bin 90 is replaced by a corrugated paper box.

Figure 3:
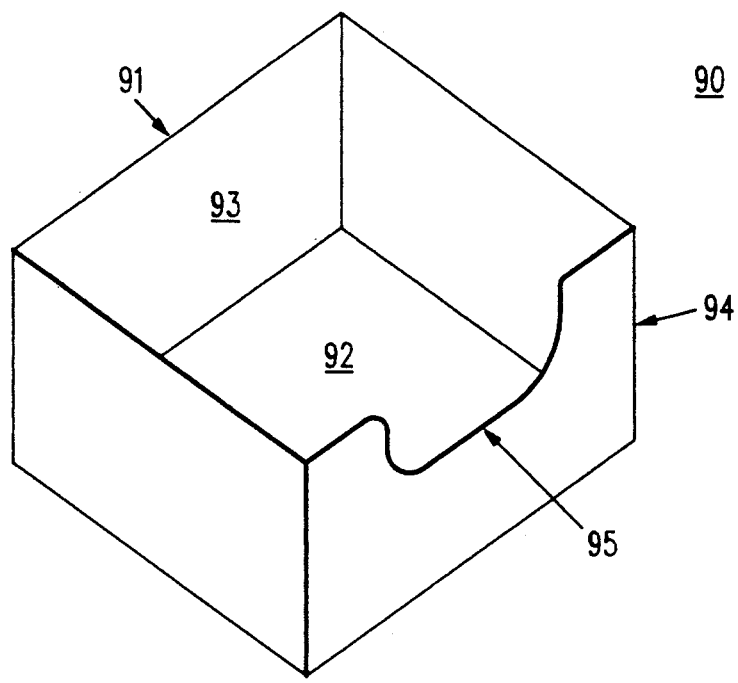
FIG. 3 is a perspective view of a bin for use with the invention of FIG. 1.

The preferred embodiment described herein is constructed to utilize containers or bins of the form illustrated in FIG. 3. Bin 90 of FIG. 3 represents any bin, box or similar open container for collecting, storing and transporting materials, and is not a part of the present invention. Bin 90 is shown in order to more fully describe the construction and use of the present invention. It is further understood that if bin 90 is constructed without scooped-out portion 95 in one side, the separation between fastener 20 and the corresponding support 30 above said fastener must be adjusted as is described with reference to FIG. 5 so that clearance between the stacked bins is provided to allow access to said bins.

Referring again to FIGS. 1A through 2C, bin supports 30 are attached to member 10 at right angles to fasteners 20 as well as to member 10, so that the three components are mutually orthogonal. The materials of which support 30 is constructed are chosen for the same reasons as described hereinabove in regard to fastener 20. In the preferred embodiment, all components are aluminum and all attachments are by welding.

Support 30 may be of round stock as illustrated or may be selected from planar materials. In the preferred embodiment, square or round stock, such as aluminum tubing identical to that selected for member 10 is utilized. This selection, however, does not preclude the use of other tubular stock, flat aluminum or polymeric sheet, plywood or similar planar materials if desired.

Figure 2B:
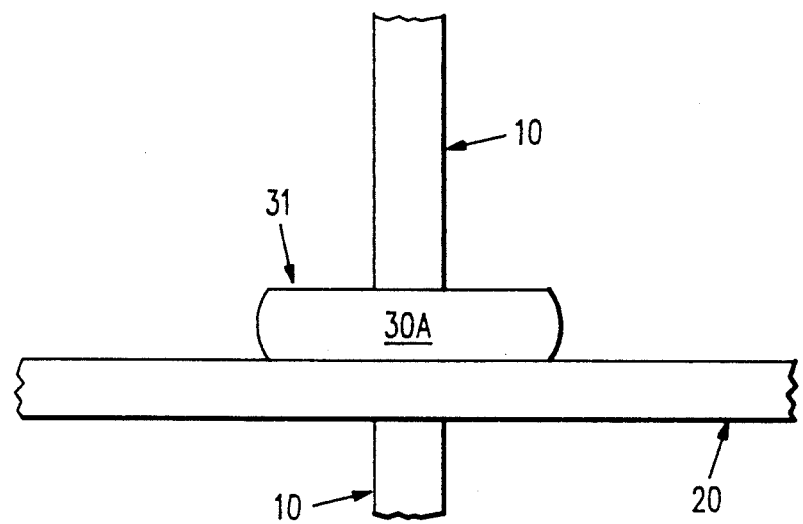
FIGS. 2B and 2C are detail front and top views, respectively, of an alternative embodiment of a support for the hand truck of FIG. 1.
Figure 2C:
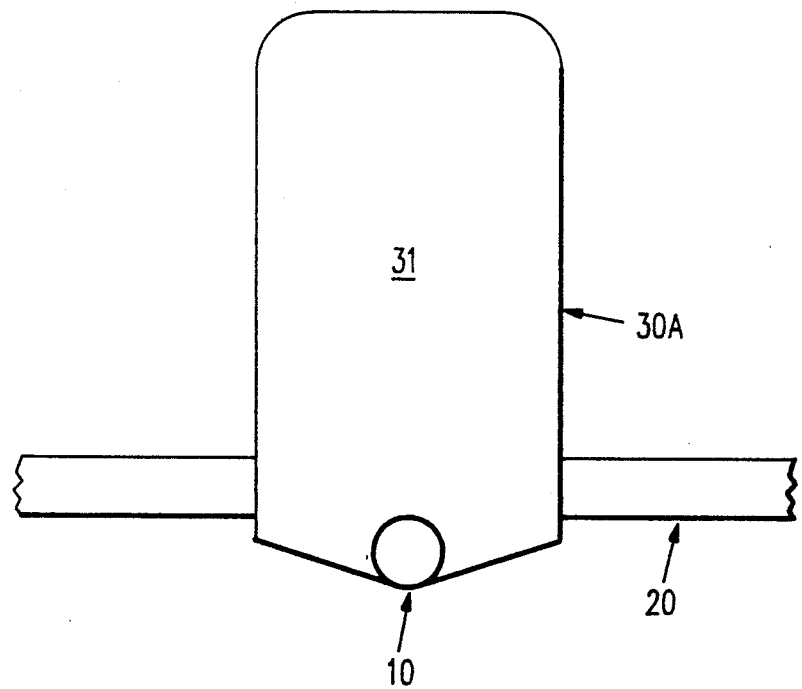

FIG. 2B shows a frontal view of support 30A which may used in place of support 30. Support 30A is a flattened, elongated shape with upper surface 31. Surface 31 supports bin 90 when bin 90 is attached as described elsewhere in this specification. FIG. 2C is a top view of support 30A showing one possible shape. Support 30A may be rectangular as shown or some other shape such as trapezoidal. The actual shape and dimensions of support 30A may thus be altered as desired to provide stable support for bins having irregular weight distribution or other special support requirements as may be necessary for other containers to be utilized with the hand truck of the present invention.

Referring again to FIG. 3, the dimensions of support 30 are determined somewhat by the width of bin 90 as described hereinbelow. Support 30 should project approximately the full width 96 of bin 90 so as to provide support across the entire bottom 92 of bin 90. The overall length of support 30 may be slightly more or less than width 96, typically 8 to 12 inches. If bottom 92 of bin 90 is suitably rigid, it is not necessary for support 30 to span the entire width 96 of bottom 92 and the shorter length is satisfactory.

Figure 4:
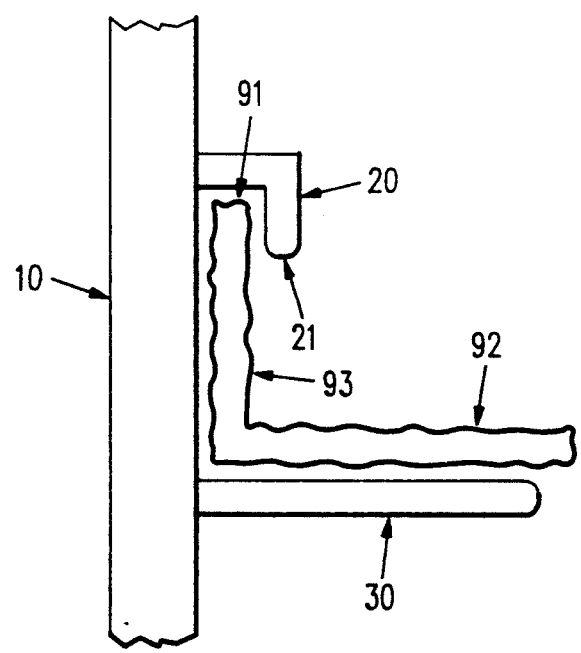
FIG. 4 is a detail showing the attachment of the bin of FIG. 3 to the hand truck of FIG. 1.

Referring now to FIGS. 3 and 4, attaching bin 90 to the hand truck of the present invention is described. To attach bin 90 to hand truck 100, bin 90 is tilted slightly and edge 91 is slipped under lip 21 of fastener 20. Fastener 20 must be shorter than edge 91 so that fastener 20 fits inside bin 90. Bin 90 is then returned to its normal upright position, thereby moving edge 91 further into the recess formed by fastener 20 and member 10. Bottom 92 of bin 90 then comes to rest on support 30, or in the case of the lowermost bin, upon brace 45. Bin 90 is then supported at the bottom by support 30 or brace 45, and secured to hand truck 100 by fastener 20.

In this manner several bins may be attached and the entire assemblage placed into use. Materials to be recycled, for example, may be placed into the bins through scooped out portion 95, allowing easy segregation of the materials. When the bins are filled, the assemblage of hand truck and bins may be moved in one trip to the appointed collection point.

To remove a bin, the bin is lifted slightly at the front edge to disengage edge 91 from fastener 20. The bin may then be handled as a separate container.

Figure 5:
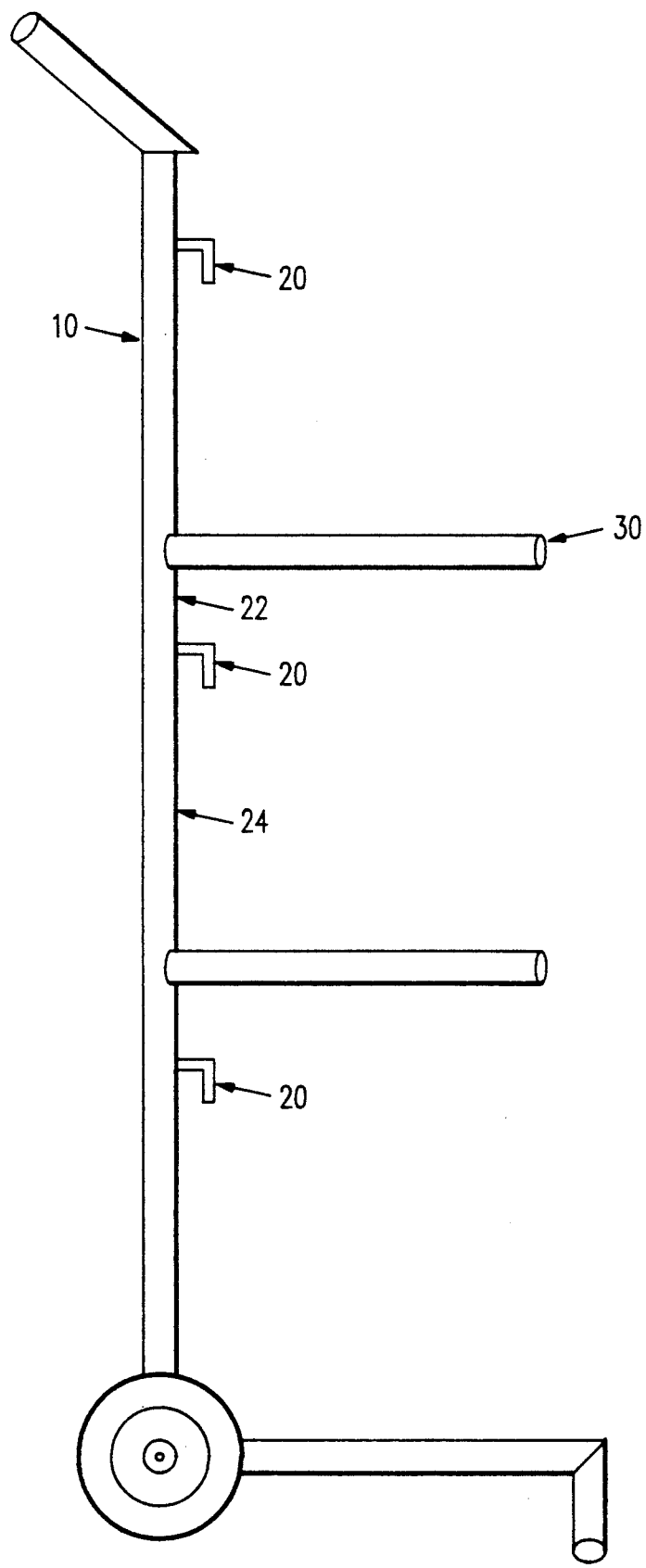
FIG. 5 is a side view of an alternative embodiment for use with bins or containers without access through the side of the container.

Referring now to FIG. 5, a hand truck suitable for use with boxes or bins lacking access space in any side is shown. The construction of this embodiment is as described hereinabove with the exception of the placement on member 10 of fasteners 20 relative to supports 30. Fastener 20 is attached to member 10 intermediate supports 30 as shown. In the figure, space 24 corresponds to the bin vertical dimension 94 as described hereinabove in reference to FIG. 3. The separation 22 between fastener 20 and support 30 provides space for access to the bin for receiving recyclable materials.

The present invention has been particularly shown and described with respect to certain preferred embodiments thereof. However, it should be readily apparent to those of ordinary skill in the art that various changes and modifications in form and details may be made without departing from the spirit and scope of the invention as set forth in the appended claims.

We claim:

1. A hand truck for holding and transporting containers, comprising:

a single longitudinal member having a handle at one end and an axle attached at the distal end, said axle being attached at right angles to said longitudinal member and having wheel mounting means at each end of said axle;

two wheels, said wheels disposed one on each end of said axle;

at least one support means permanently attached to said longitudinal member at right angles to said member and said axle, said support means being disposed mutually orthogonally to said longitudinal member and said axle;

at least one fastening means permanently attached to said longitudinal member at right angles to said longitudinal member and said support means, said fastening means being disposed parallel to said axle and mutually orthogonal to said longitudinal member and said support means, said fastening means having two legs disposed in a right angle forming a right-angle cross section having the said two legs meeting at an apex; and one linear brace means having one end permanently attached at right angles to said longitudinal member proximal to said axle and at right angle to said axle, said brace means, axle and longitudinal member being disposed mutually orthogonally, said brace means having a vertically disposed extension parallel to said longitudinal member at the end distal to said attached end, said extension extending in a direction away from said handle and having a length equivalent to the radius of said wheels.

2. A hand truck as in claim 1 wherein the cross-sectional shape of said fastening means is an open channel comprising a backstrap and two legs, a first said leg disposed along a first edge of said backstrap and a second said leg disposed along a second edge of said backstrap, said channel having sharply formed right angles between each of said legs and said backstrap of said channel.

3. A hand truck as in claim 1 wherein said metal is iron.

4. A hand truck as in claim 1 wherein said metal is steel.

5. A hand truck as in claim 1 wherein said metal is aluminum.

6. A hand truck as in claim 1 wherein the permanent attachment of said fastening members to said longitudinal member is by welding.

7. A hand truck as in claim 1 wherein said longitudinal member is comprised of metal tubing having a round cross-section.

8. A hand truck for holding and transporting containers, comprising:

a single longitudinal member having an axle for receiving wheels permanently attached at one end, said axle being attached at right angles to said longitudinal member, said longitudinal member being metal tubing, said tubing having a rectangular cross section, said longitudinal member having a handle for grasping said hand truck rigidly attached to said longitudinal member;

three linear metal fastening members permanently attached to said longitudinal member, said fastening members oriented at right angles to said longitudinal member and parallel to said axle, said fastening members disposed along said longitudinal member, a first said fastening member being disposed proximal the end of said longitudinal member distal said axle, a second said fastening member being disposed proximal one third the distance from said axle to said distal end of said longitudinal member, and a third said fastening member being disposed medial said first and second fastening members, said fastening members being constructed of metal, said metal having a cross section forming a channel having the opening of said channel oriented toward said axle, said channel having a backstrap and two legs, a first said leg disposed along one edge of said backstrap and a second said leg disposed along a second edge of said backstrap, said legs of said channel each meeting said backstrap at a right angle having an apex having a small radius;

two wheels, said wheels disposed one on each end of said axle, said wheels detachably attached to said axle;

three linear metal supporting members, one end of each of said supporting members permanently attached to said longitudinal member, said supporting members disposed along said longitudinal member and at mutually orthogonal right angles to said longitudinal member and said axle, a first said supporting member being disposed proximal said axle, a second said supporting member being disposed proximal one third the distance from said axle and the end of said longitudinal member distal said axle, and a third said supporting member being disposed medial said first and second supporting members; and one bracing member rigidly attached to said first supporting member at a right angle, said bracing member having a length approximately equal to the radius of said wheels, said bracing member disposed at the end of said first supporting member distal from the end where said supporting member is attached to said longitudinal member, said bracing member being oriented parallel to said longitudinal member.

9. A hand truck as in claim 8 wherein said metal is iron.

10. A hand truck as in claim 8 wherein said metal is steel.

11. A hand truck as in claim 8 wherein said metal is aluminum.

12. A hand truck as in claim 8 wherein the permanent attachment of said fastening members to said longitudinal member is by welding.

13. A hand truck as in claim 8 wherein said longitudinal member is comprised of metal tubing having a round cross-section.

14. A hand truck as in claim 8 wherein said second and said third supporting members are made of planar metal.